United States Patent [19]

Bremholt

[11] 4,209,597
[45] Jun. 24, 1980

[54] PROCESS FOR EXTRUDING AND CROSS-LINKING OLEFIN POLYMERS, DIOLEFIN POLYMERS, AND COPOLYMERS OF OLEFINS AND DIOLEFINS AND COPOLYMERIZABLE MONOMERS

[75] Inventor: Sven A. T. Bremholt, Fristad, Sweden

[73] Assignee: AB Gustavsberg, Fristad, Sweden

[21] Appl. No.: 943,897

[22] Filed: Sep. 19, 1978

[30] Foreign Application Priority Data

Sep. 19, 1977 [SE] Sweden ................................ 7710448

[51] Int. Cl.² ................................................ C08F 8/30
[52] U.S. Cl. .................................. 525/376; 260/42.32; 260/42.33; 260/42.39; 425/DIG. 16
[58] Field of Search ................ 526/51; 425/DIG. 16; 525/376; 260/42.32, 42.33, 42.39

[56] References Cited

U.S. PATENT DOCUMENTS

| | | | |
|---|---|---|---|
| 2,469,819 | 5/1949 | Flory et al. | 526/51 |
| 2,994,357 | 8/1961 | Serniuk et al. | 526/51 |
| 4,129,531 | 12/1978 | Rauer et al. | 526/51 |

*Primary Examiner*—William F. Hamrock

[57] ABSTRACT

A process is provided for extruding and cross-linking olefin polymers, diolefin polymers and copolymers thereof with other olefins, diolefins, or monomers copolymerizable therewith, using as the cross-linking agent an azo compound of the formula:

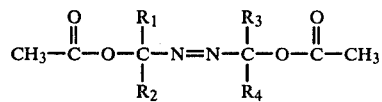

wherein $R_1$, $R_2$, $R_3$ and $R_4$ are alkyl having from one to about six carbon atoms.

The process is of particular application in the production of cross-linked pipe of such polymers and copolymers.

30 Claims, No Drawings

PROCESS FOR EXTRUDING AND CROSS-LINKING OLEFIN POLYMERS, DIOLEFIN POLYMERS, AND COPOLYMERS OF OLEFINS AND DIOLEFINS AND COPOLYMERIZABLE MONOMERS

Two methods are generally employed commercially for the preparation of extruded polyethylene pipe or tubing, the Engel process and the Dow Corning process. In both processes, the polyethylene is extruded and cross-linked, to obtain the finished pipe.

In the Engel process, polyethylene is cross-linked during extrusion using a peroxide cross-linking agent at extraordinarily high pressure. This process requires special extruders that are capable of applying such high pressures, because conventional extruders cannot be used. The extruders required are expensive and complicated. At the same time, the polyethylene undergoes a decrease in density in the course of cross-linking. At a starting density, for example, of about 0.950, the polyethylene after cross-linking will have a density of about 0.932.

The Dow Corning process has the advantage of utilizing a conventional extruder, but the cross-linking is very slow. The crosslinking is obtained using a silicon cross-linking agent together with a small amount of peroxide cross-linking agent, ranging from 0.1 to 0.2%. the cross-linking is carried out by application of steam to the extruded pipe or tubing. The crosslinking is incomplete, and consequently the degree of crosslinking is low. Up to one week's heat treatment may be needed before an acceptable cross-linked product is obtained.

In accordance with the present invention, novel cross-linking agents are employed which are capable of effecting a rapid cure after extrusion. Thus, the process of the invention can employ conventional extruders and conventional extrusion conditions, and at the same time gives a finished cross-linked pipe or tubing in virtually the same total processing time as in the Engel process.

The cross-linking agents in accordance with the invention are liquid or solid azo compounds having the formula:

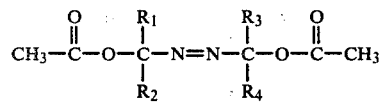

wherein each of $R_1$, $R_2$, $R_3$ and $R_4$ are alkyl having from one to about six carbon atoms, and can be the same or different. Exemplary alkyl include methyl, ethyl, n-propyl, isopropyl, n-butyl, isobutyl, secondary butyl, tertiary butyl, n-amyl, isoamyl, secondary amyl, tertiary amyl, n-hexyl, isohexyl, tertiary hexyl and secondary hexyl. Particularly preferred compounds are those in which $R_1$ and $R_3$ are methyl, and $R_2$ and $R_4$ are either methyl, ethyl or isopropyl.

These compounds cross-link with olefin polymers, diolefin polymers, and copolymers thereof with other olefins, other diolefins, and other monomers copolymerizable therewith, at moderately elevated temperatures within the range from about 175° C. to about 275° C.

The process of the invention is applicable to polymers and copolymers of any olefins and diolefins, and particularly poly-α-olefins, and poly-1,3-diolefins, such as, for example, polyethylene, ethylenevinyl acetate copolymer, ethylene propylene rubber, ethylene-propylene-ethylidenenorbornene rubber, styrene-butadiene rubber and polybutadiene rubber.

The cross-linking effect depends upon the amount and type of azo cross-linking agent employed. A good effect is obtained using only small amounts of the cross-linking agent. In general, the amount should be within the range from about 0.05 to about 10%, and preferably within the range from about 0.5 to about 3%, by weight of the polymer or copolymer.

In addition to the base polymer or copolymer and the cross-linking agent, the resin composition can include the conventional adjuncts for extruded pipe and tubing materials, including lubricants, antioxidants, ultraviolet light stabilizers, heat stabilizers, impact-modifiers, fillers, pigments, plasticizers, extenders, and similar materials. Such materials are generally used in amounts of each within the range from about 0.1 to about 10% and preferably from about 0.1 to about 5% by weight of the polymer or copolymer, and in total amounts not exceeding about 50% by weight of the polymer or copolymer.

As the antioxidant there can be used phenols, particularly the sterically-hindered phenols, aromatic amines, aminophenols, polymerized hydroquinolines (Flectol H) and other conventional heat stabilizers for such polymeric materials. Exemplary antioxidants, heat stabilizers and ultraviolet light stabilizers are listed in U.S. Pat. No. 4,016,168 to Murayama et al patented Apr. 5, 1977, the disclosure of which is incorporated by reference.

As lubricants there can be used fatty acids and fatty acid salts such as stearic acid, oleic acid, calcium stearate and barium stearate.

As fillers and pigments there can, for example, be used carbon black, pulverized carbon, granulated carbon, titanium dioxide, silica, and fibrous materials such as glass, carbon, silica, boron oxide and titania fibers, and mixtures thereof.

In carrying out the process in accordance with the invention, the extrudable composition is prepared by blending the intended ingredients. Thorough mixing should be applied before the material is passed through the extruder. A hot-mixing at an elevated temperature within the range from about 30° to about 200° C., for polyethylene not more than 75° C., in order to obtain a thorough homogenization, such as, for example, a mixing at 70° C. in a Papenmaier mixer, is particularly advantageous. The Papenmaier mixer is manufactured and sold by Güter Papenmaier KG Maschinen-und Apparatenbau, Western Germany. During hot-mixing, moisture and volatile materials such as solvent residues are driven out, thus facilitating the extrusion, and preventing gassing defects. After hot-mixing, the material can be cooled to a temperature of about 40° C., and desirably within the range from about 60° to about 30° C. and is then fed to a conventional extruder, using for instance a screw feeder and extrusion nozzle or die of required tubing or pipe dimensions and shape. An extruder of the double screw type is preferred.

The extruder can include a vacuum or low pressure chamber, in which the material is subjected to a subatmospheric pressure for a period sufficient to remove volatile materials and gases which might deleteriously affect the extrusion. If, however, a thorough hot-mixing precedes the extrusion, and volatile materials and gases have been stripped off, a low pressure pretreatment is not so necessary.

During extrusion the composition is reduced to an extrudable viscous fluid or softened plastic of high viscosity, and is then extruded through the nozzle or die into the desired form such as a pipe. Cross-linking may begin in the course of the extrusion although this has not been proved, but it is preferred that cross-linking is initiated and completed by heating the extruded material at an elevated temperature for a sufficient time. The heating temperature is sufficient to induce and continue the cross-linking reaction, within the range from about 175° C. to about 275° C., and preferably within the range from about 220° C. to about 250° C., according to the polymeric material and other ingredients present. The azo compounds are reactive although at a low rate at temperatures above about 180° C. up to about 200° C. A rapid reaction is obtained at temperatures within the range from about 200° C. to about 300° C. The cross-linking reaction is complete within a matter of minutes to one or two hours, according to the temperature, cross-linking agent and polymeric material.

The heating can be applied in an oven, or by application of infrared radiation, microwaves, or beta or gamma radiation, or in a bath of nonvolatile inert liquid such as a molten salt bath, or in a fluidized bed of particulate heated material, such as metal or sand. These are all conventional heating means in pipe and tubing extrusion, and form no part of the invention. A molten salt bath is preferred, since such a bath makes it possible to maintain an even elevated temperature in a nonoxidizing atmosphere for any desired length of time, inasmuch as the extruded form is immersed in the bath. As the salt bath, there can for example be employed a mixture of substantially equal parts of $KNO_3$ and $NaNO_2$ (colorant added), having a unit weight of about 2.10 g/cm$^3$ at 20° C.

The soft extruded form may under the pressure of the bath become deformed or even collapse, and to avoid this the form is pressurized internally by addition of an inert gas such as nitrogen at a pressure depending on the size of the pipe, within the range from about 5 to about 250 g/cm$^2$, and preferably at least about 10 g/cm$^2$.

If the extruded material is being processed in continuous lengths, as is conventional, it is convenient to employ a heating zone long enough, according to the rate of advance of the extruded material, to give the desired cross-linking time as the transit time through the zone. This depends of course upon the delivery rate of the extruded form from the extruder, and the temperature in the heating zone will be adjusted accordingly.

Following completion of the cross-linking, the extruded pipe or tubing can be gauged, to ensure that it meets the required dimensional specifications.

The following Examples in the opinion of the inventors represent preferred embodiments of the invention.

When applying the process of the invention the pipe or tubing may be extruded as an insulation covering conductors of an electric cable.

EXAMPLE 1

An extrudable polyethylene composition was prepared having the following formulation:

| Ingredient | Parts by Weight |
|---|---|
| Powdered polyethylene, BASF Lupolen 4261A, density 0.942–0.945 | 100.0 |
| Azo cross-linking agent: | 1.5 |

| Ingredient | Parts by Weight |
|---|---|
| 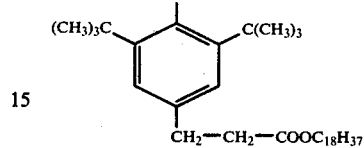 | |
| Irganox 1076[1] powder | 0.25 |
| Granulated carbon black (master batch) | 2.0 |

[1]

The ingredients were mixed together at 70° C. in a Papenmaier mixer, and then extruded in a conventional double screw extruder with a depressurizing chamber, emerging as pipe. The continuous lengths of pipe were passed through a salt bath composed of substantially 50% $KNO_3$ and 50% $NaNO_2$ and held at 240° C., through which the transit time was about 10 minutes.

The finished pipe had a density of about 0.932, and a degree of crosslinking of 80 to 95% as measured according to ASTM. In this method the crosslinked material is boiled in a hydrocarbon having a high boiling temperature, such as decaline. The degree of crosslinking is expressed in percent according to the relation 100·a/b where a is the amount of material remaining after boiling, and b is the amount of initial material.

EXAMPLE 2

An extrudable polyethylene composition was prepared having the following formulation:

| Ingredient | Parts by Weight |
|---|---|
| Powdered polyethylene, BASF Lupolen 4261A density 0.942–0.945 | 100.0 |
| Azo cross-linking agent: $CH_3-\overset{O}{\overset{\|}{C}}-O-\overset{CH_3}{\underset{CH_2-CH_3}{\overset{\|}{C}}}-N=N-\overset{CH_3}{\underset{CH_2-CH_3}{\overset{\|}{C}}}-O-\overset{O}{\overset{\|}{C}}-CH_3$ | 1.0 |
| Irganox 1076[1] powder | 0.25 |
| Granulated carbon black | 2.0 |

[1]

The ingredients were mixed together at 70° C. in a Papenmaier mixer, and then extruded in a conventional double screw extruder with a depressurizing chamber emerging as pipe. The pipe was plunged into a salt bath composed of substantially 50% $KNO_3$ and 50% $NaNO_2$ held at 240° C., and moved slowly and continuously through the bath at a transit time of about 10 minutes.

The finished pipe had a density of 0.932 and a degree of crosslinking of 80 to 95% as measured according to ASTM.

EXAMPLE 3

An extrudable polyethylene composition was prepared having the following formulation:

| Ingredient | Parts by Weight |
|---|---|
| Powdered polyethylene, BASF Lupolen 4261A density 0.942–0.945 | 100.0 |
| Azo cross-linking agent: | 1.0 |

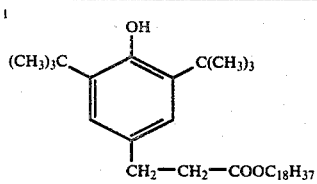

| | |
|---|---|
| Irganox 1076[1] powder | 0.25 |
| Granulated carbon black | 2.0 |

[1]

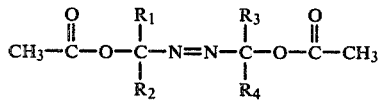

The ingredients were mixed together at 70° C. in a Papenmaier mixer, and then extruded in a conventional double screw extruder with a depressurizing chamber emerging as a pipe. The pipe was passed through a salt bath composed of substantially 50% $KNO_3$ and 50% $NaNO_2$ held at 210° to 220° C. over a transit time of about 10 minutes.

The finished pipe had a density of 0.932 and a degree of crosslinking of 80 to 90% as measured according to ASTM.

Having regard to the foregoing disclosure, the following is claimed as the inventive and patentable embodiments thereof:

1. A process is provided for extruding and cross-linking in shaped form olefin polymers, diolefin polymers and copolymers thereof with other olefins, diolefins, or monomers copolymerizable therewith, which comprises extruding the polymer in shaped form in the presence as cross-linking agent of an azo compound of the formula:

$$CH_3-\overset{O}{\underset{\|}{C}}-O-\underset{\underset{R_2}{|}}{\overset{\overset{R_1}{|}}{C}}-N=N-\underset{\underset{R_4}{|}}{\overset{\overset{R_3}{|}}{C}}-O-\overset{O}{\underset{\|}{C}}-CH_3$$

wherein $R_1$, $R_2$, $R_3$ and $R_4$ are alkyl having from one to about six carbon atoms, and then heating the extruded polymer in shaped form at a temperature within the range from about 175° C. to about 275° C. to effect cross-linking reaction between the polymer and the azo compound.

2. A process according to claim 1 in which the shaped form is pipe or tubing.

3. A process according to claim 1 in which the shaped form is an insulation of an electric cable.

4. A process according to claim 1 in which the polymer is a poly-α-olefin.

5. A process according to claim 1 in which the poly-α-olefin is polyethylene.

6. A process according to claim 1 in which the polymer is ethylene-vinyl acetate copolymer.

7. A process according to claim 1 in which the polymer is ethylene propylene rubber.

8. A process according to claim 1 in which the polymer is ethylene-propylene-ethylidenenorbornene rubber.

9. A process according to claim 1 in which the polymer is styrene-butadiene rubber.

10. A process according to claim 1 in which the polymer is polybutadiene rubber.

11. A process according to claim 1 in which the amount of azo cross-linking agent is within the range from about 0.05 to about 10% be weight of the polymer or copolymer.

12. A process according to claim 11 in which the amount of azo cross-linking agent is within the range from about 0.5 to about 3% by weight of the polymer or copolymer.

13. A process according to claim 1 in which the polymer composition includes at least one adjunct for extruded material selected from the group consisting of lubricants, antioxidants, ultraviolet light stabilizers, heat stabilizers, impact-modifiers, fillers, pigments, plasticizers and extenders, each in amounts of within the range from about 0.1 to about 10% by weight of the polymer, and in a total amount not exceeding about 50% by weight of the polymer.

14. A process according to claim 13 in which the antioxidant is selected from the group consisting of phenols, aromatic amines, aminophenols and polymerized hydroquinolines.

15. A process according to claim 13 in which the filler is carbon black.

16. A process according to claim 1 in which the extrudable composition is prepared by blending the polymer and azo compound and hot-mixing at a temperature within the range from about 30° to about 200° C.

17. A process according to claim 16 in which after hot-mixing the material is cooled to a temperature within the range from about 60° to about 30° C. and is then fed to the extruder.

18. A process according to claim 1 in which the heating temperature after extrusion is within the range from about 175° C. to about 275° C., for a time within the range from several minutes to two hours.

19. A process according to claim 18 in which the heating is applied in an oven.

20. A process according to claim 18 in which the heating is applied by immersion in a bath of nonvolatile inert liquid.

21. A process according to claim 20 in which the liquid bath is a molten salt bath.

22. A process according to claim 20 in which the extruded form during immersion is pressurized internally by addition of an inert gas at a pressure within the range from about 5 to about 250 g/cm².

23. Extruded pipe or tubing comprising a polymer selected from the group consisting of olefin polymers, diolefin polymers, and copolymers thereof with other olefins, diolefins, or monomers copolymerizable therewith, cross-linked with an azo compound of the formula:

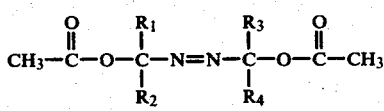

wherein $R_1$, $R_2$, $R_3$ and $R_4$ alkyl having from one to about six carbon atoms.

24. Extruded pipe or tubing according to claim 23 in which the polymer is a poly-α-olefin.

25. Extruded pipe or tubing according to claim 24 in which the poly-α-olefin is polyethylene.

26. Extruded pipe or tubing according to claim 23 in which the polymer is ethylene-vinyl acetate copolymer.

27. Extruded pipe or tubing according to claim 23 in which the polymer is ethylene propylene rubber.

28. Extruded pipe or tubing according to claim 23 in which the polymer is ethylene-propylene-ethylidenen-orbornene rubber.

29. Extruded pipe or tubing according to claim 23 in which the polymer is styrene-butadiene rubber.

30. Extruded pipe or tubing according to claim 23 in which the polymer is polybutadiene rubber.

* * * * *